Nov. 8, 1949　　　M. SCHWARTZ ET AL　　　2,487,773
VIEW FINDER FOR PHOTOGRAPHIC APPARATUS
Filed Jan. 22, 1947　　　　　　　　　　　2 Sheets-Sheet 1

INVENTORS
MORRIS SCHWARTZ
WILLIAM CASTEDELLO
BY
ATTORNEY

Patented Nov. 8, 1949

2,487,773

UNITED STATES PATENT OFFICE 2,487,773

VIEW FINDER FOR PHOTOGRAPHIC APPARATUS

Morris Schwartz and William Castedello, Stamford, Conn.

Application January 22, 1947, Serial No. 723,521

5 Claims. (Cl. 88—1.5)

This invention relates to view finders for photographic apparatus such as photographic cameras, movie cameras, etc., particularly to collimating view finders.

View finders of the general type, for cameras above referred to, are conventionally used to frame the image of an object at which the camera associated with the view finder is aimed, for the purpose of indicating to the operator the limits of the image that will be projected by the camera lens upon a sensitized plate or film in the camera.

One object of the invention is a novel and improved collimating view finder framing a distinct and clear image of an object to be viewed while permitting a clear and full view of the field of normal vision.

Another object of the invention is a novel and improved view finder producing a framed image of an object which is distinct and definite in its outline and will not be affected or varied by a shifting of the eye of an observer sighting through the eyepiece of the view finder. This has the advantage that the view finder will frame a true duplicate of the image that will actually be projected by the camera lens.

Another object of the invention is a novel and improved view finder in which the area framed by the view finder is visually superimposed into the field of normal vision when one eye of an observer is employed to view an exterior object directly and the other is held closely to the eyepiece of the view finder.

Another object of the invention is a novel and improved view finder in which the framed image of an object is formed without requiring or using direct vision of the object through the view finder. A view finder of this type has the important advantage that use of the view finder will not be affected by obstacles directly in line between the finder and the object such as protruding parts of the camera associated with the view finder, and that the view finder can be used as long as there is sufficient light to see the object to be viewed at all since practically no light is lost within the view finder proper.

Another object of the invention is a novel and improved view finder which permits the use of both eyes and in which the framed image appears life-sized.

Another object of the invention is a novel and improved view finder which can be easily and inexpensively manufactured and fastened to or fitted in any suitable part of the camera, since, as previously mentioned, protruding parts of the camera will not interfere with the operation of the view finder.

Other and further objects, features and advantages of the invention will be hereinafter set forth and the novel features thereof defined by the appended claims forming part of the appplication.

The present application is a continuation in part of our co-pending application Ser. No. 525,878 filed March 10, 1944, now abandoned.

In the accompanying drawings several now preferred embodiments of the invention are shown by way of illustration and not by way of limitation.

Figure 1:
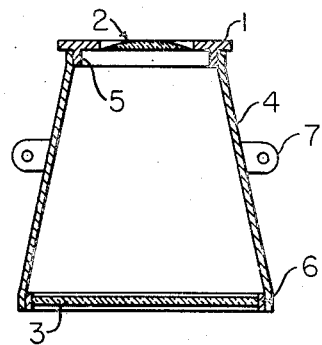
Fig. 1 is a sectional diagrammatic view of a view finder according to the invention which may be used in conjunction with a photographic camera.
Figure 2:
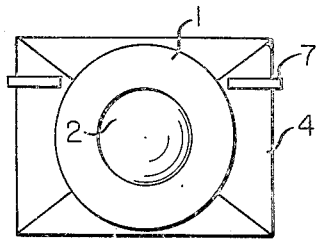
Fig. 2 is an elevational view of Fig. 1.

Referring now to the figures in detail, the view finder as shown in Figs. 1 and 2 comprises a plate 1 in which is mounted an eyepiece, generally designated by 2, a mask 3 and a housing 4. The housing may have any suitable shape, for example it may be tapered as shown, cylindrical or square. It may be made of any suitable material such as metal or plastic. Lens plate 1 and mask 3 may be fastened to housing 4 by suitable means for instance, plate 1 may have a collar 5 engaging housing 4, and mask 3 may be mounted in a collar 6 also fitted into housing 4. The view finder can be fastened to a camera by any suitable means such as ears 7.

It should be noted in this connection that the essential features of the invention reside in the optical relationship of lens 2 serving as eyepiece and mask 3 and in the peculiar viewing effect, rather than in the mounting of elements 2 and 3 in a particular kind of housing. A view finder according to the invention can be equally well incorporated directly in the casing of a photographic apparatus such as a camera. In such event, a window has to be provided for eyepiece 2 and a second window for mask 3, as it is well known to any person skilled in the art.

Mask 3 is shown as a plate made of any suitable material such as glass or a transparent plastic. The mask is provided with a framed area 8 marked by lines 9. The framed area 8 can be marked either by light lines on dark ground or by dark lines on light ground. Tests have shown that an enclosed area marked by light markings on dark ground is preferable to a framed area marked by dark markings on light ground. The dark and light areas of the mask may be black and white or differently shaded, for example differently colored.

To attain the desired contrast in the markings, the framed lines are preferably clear or fully transparent lines while the remainder of the mask surface, both inside and outside of the framed area 8, is ground or frosted so that a certain translucency of the mask is retained.

The frame lines can be marked by etching, cutting, photographing, printing, or any other suitable process. It is also possible to thin the mask plate along the intended frame lines.

Practical tests have shown that the illumination of the lines circumscribing the framed area 8 is of great importance for the efficiency of the view finder. A high light gathering power of the mask lines is particularly essential to the use of a wide field eyepiece as it is desirable for modern cameras to embrace wide angles of view.

Figure 5:
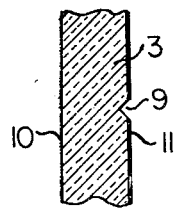
Fig. 5 is a partial sectional view of a mask according to Fig. 3 or 4 on an enlarged scale.

A mask plate design as shown on Fig. 5, has been found to be particularly advantageous. The mask of Fig. 5 comprises a body 3 made of glass or transparent plastic and is provided on its side facing the object to be viewed with a ground or opal surface 10. The opposite side facing eyepiece 2 is coated with an opaque coat 11 or otherwise made opaque. In this opaque surface, the frame lines 9 are engraved so as to form a trough or groove, preferably having a V-shaped cross-section. Extensive tests have shown that the angular sides of frame lines 9 help to gather light from the ground surface which in turn is illuminated by light coming from the object being viewed. As a result, the frame lines appear to be strongly illuminated even if the exterior light is comparatively weak.

Eyepiece 2, diagrammatically shown on Fig. 1, comprises a wide angle lens focused upon mask 3. As will be apparent, the distance between eyepiece and mask has to be quite short in practice, to fit the view finder into the space normally available for both, view finders designed as an attachment and view finders built into the camera casing proper. On the other hand, the mask plate and the enclosed area thereon should be as large as possible to attain a satisfactory viewing effect. As a result, the angle of the lens must be exceedingly wide, in practice an angle between 70 to 80° has been found necessary.

Figure 6:
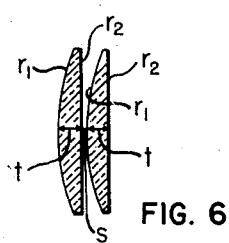
Fig. 6 is a sectional view of a modification of the lens system of the eyepiece of the view finder according to Fig. 1.

Fig. 6 shows a lens system designed for such angle. The optical constants of the lens system according to Fig. 6 are as follows:

Glass: $n_d=1.523$; $v=58.8$
Radii: $r_1=1.26''$; $r_2=\infty$
Spacing: $s=0.02''$
Thickness: $t=0.156''$
Focal length: $=1.26''$ in which $n_d$ is the index of refraction and $v$ is the reciprocal of the dispersive power.

An eyepiece according to Fig. 6 covers an angle of 70 to 80°. It shows little astigmatism and only moderate amounts of coma and lateral chromatic aberration.

Figure 7:
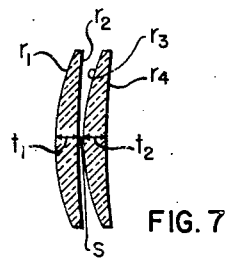
Fig. 7 is a modification of the lens system according to Fig. 6.

If desired, distortion and chromatic lens aberration can be further reduced by using a lens system as shown in Fig. 7 which has the following optical constants:

Glass: $n_d=1.611$; $v=58.8$
Radii: $r_1=1.50''$; $r_2=9.50''$; $r_3=1.45''$; $r_4=6.25''$
Spacing: $s=0.02''$
Thickness: $t_1=0.22''$; $t_2=0.16''$
Focal length: $=1.26''$ in which $n_d$ is the index of refraction and $v$ is the reciprocal of the dispersive power.

Eyepiece as shown on Figs. 6 and 7 and designed according to the previously given constants are characterized by very large eye relief and extreme angle of view with simplicity of construction.

Figure 4:
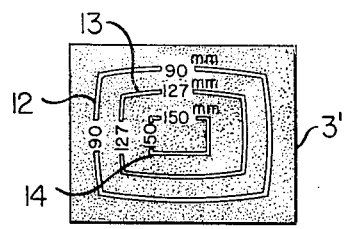

A certain distortion is inherent in short-focus wide field eyepieces. As a result of such distortion, the framed area superimposed into the field of normal vision may appear somewhat distorted to an observer. Fig. 4 shows a mask arrangement which compensates for the inherent distortion of the eyepiece. According to Fig. 4, mask plate 3' includes framed areas which are circumscribed by deformed or bowed lines. Three enclosed areas circumscribed by lines or rather grooves 12, 13 and 14 are shown. The distortion of the frame lines increases with increased enclosed area, the smallest frame being shown as having straight lines. The distortion of each enclosed area is selected so as to have the same amount and kind of distortion as the lens system for the respective enclosed area.

The purpose and advantage of providing a plurality of masking areas are that the fields of view of a plurality of camera lenses of different focal lengths can be covered by the same view finder. Mask 12 may be intended for a wide angle camera lens, mask 13 for a normal lens, and mask 14 for a telephoto lens, as indicated by the distances marked on the mask. It will of course be understood that the mask according to Fig. 3 can also be provided with a plurality of masking areas, and vice versa only one masking area circumscribed curved lines or grooves may be employed.

Figure 3:
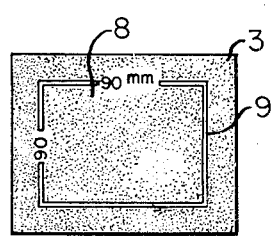
Figs. 3 and 4 are plan views of framing masks that may be used in a view finder according to Fig. 1.

The structural design of the mask plate according to Fig. 4 is preferably the same as has been described in connection with Fig. 3.

Figure 8:
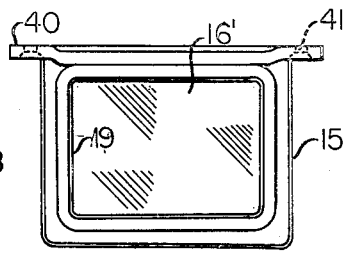
Fig. 8 is a plan view upon the lens system of a modification of a view finder according to the invention.
Figure 10:
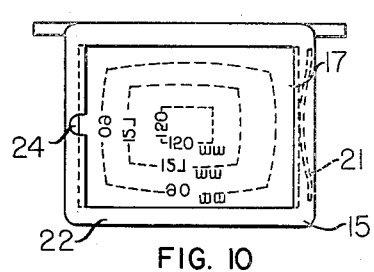
Fig. 10 is a plan view of the mask of the view finder according to Fig. 8.
Figure 9:
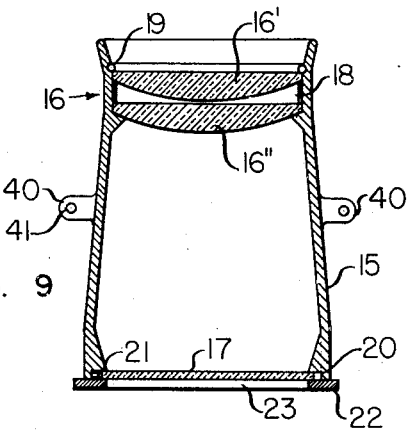
Fig. 9 is a sectional view of Fig. 8.

Figs. 8, 9 and 10 show a now preferred embodiment of a view finder according to the invention. According to these figures, the view finder comprises a preferably rectangular slightly tapered housing 15, a wide angle eyepiece 16 and a mask plate 17. The eyepiece is composed of lenses 16' and 16'' and preferably designed as described in connection with Figs. 6 and 7. The two lenses of the eyepiece are held in position by a spacer 18 and a rectangular split ring 19. Mask 17 upon which the eyepiece is focused, is designed as shown in Fig. 4 and described in connection therewith.

In certain instances, it may be desirable to exchange mask 17. For this purpose, the mask is fitted into a recess 20 of housing 15. This recess leaves a clearance at both short edges of the mask. In one of the clearances, which is preferably somewhat wider, a leaf spring 21 is fitted which urges the mask towards the opposite edge of the recess. The mask is held in its position in the recess by means of a cover plate 22 having a window 23 for the mask. The short side of this window is equal to the short edge of the mask while the long side of the window is slightly shorter than the longer edge of the mask, thereby securing the same in its position. A recess 24 in the cover plate permits to engage the edge of the mask opposite to the edge engaged by spring 21 by a suitable tool and to shift the mask against the action of spring 21 (toward the right in Fig. 10) until the engaged edge of the mask clears the window so that the mask can be removed and exchanged.

The view finder can be fastened to a camera casing by any suitable means such as ears 40 with screw holes 41.

While the invention has been described in detail with respect to certain now preferred examples and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A collimating view finder for a photographic apparatus comprising in combination, a mask, and a wide angle, short focal length eyepiece having an angle of at least 70° and a substantially flat field focused upon the mask, said mask comprising a plane plate made of transparent material and having a substantially opaque surface on the side facing the eyepiece, said opaque surface including a framed area defined by substantially V-shaped grooves extending into the transparent plate material, the angular walls of said grooves having light collecting properties.

2. A collimating view finder for a photographic apparatus comprising in combination, a mask, and a wide angle, short focal length eyepiece having an angle of at least 70° and a substantially flat field focused upon the mask, said mask comprising a plane plate made of transparent material and having a translucent light diffusing surface on the side facing an exterior object and a substantially opaque surface on the side facing the eyepiece, said opaque surface including a framed area defined by tapered grooves extending into the transparent plate material and having light collecting properties.

3. A collimating view finder as described in claim 2, wherein said tapered grooves have a substantially V-shaped cross-section, the angular walls of said grooves having light collecting properties.

4. A collimating view finder for a photographic apparatus, comprising in combination a mask, and a wide angle, short focal length eyepiece having an angle of at least 70° and a substantially flat field focused upon the mask, said eyepiece being composed of two lenses, each having the optical constants:

Glass: $n_d=1.523$; $v=58.8$
Radii: $r_1=1.26''$; $r_2=\infty$
Thickness: $t=0.156''$
Focal length: $=1.26''$
Spacing between the lenses: $s=0.02''$ in which $n_d$ is the index of refraction and $v$ is the reciprocal of the dispersive power said mask comprising a plane plate made of transparent material and having a translucent light diffusing surface on the side facing an exterior object and a substantially opaque surface on the side facing the eyepiece, said opaque surface including a framed area being defined by tapered grooves extending into the transparent plate material, the walls of said grooves having light collecting characteristics.

5. A collimating view finder for a photographic apparatus, comprising in combination a mask, and a wide angle, short focal length eyepiece having an angle of at least 70° and a substantially flat field focused upon the mask, said eyepiece being composed of a lens having the optical constants:

Glass: $n_d=1.611$; $v=58.8$
Radii: $r_1=1.50''$; $r_2=9.50''$
Thickness: $t_1=0.22''$ and a second lens having the optical constants:

Glass: $n_d=1.611$; $v=58.8$
Radii: $r_3=1.45''$; $r_4=6.25''$
Thickness: $t_2=0.16''$ in which $n_d$ is the index of refraction and $v$ is the reciprocal of the dispersive power said two lenses being spaced $s=0.02''$, said eyepiece having a focal length of $1.26''$, and said mask comprising a plane plate made of transparent material and having a translucent light diffusing surface on the side facing an exterior object and a substantially opaque surface on the side facing the eyepiece, said opaque surface including a framed area defined by tapered grooves extending into the transparent plate material, the walls of said grooves having light collecting characteristics.

MORRIS SCHWARTZ.
WILLIAM CASTEDELLO.

REFERENCES CITED

The following references are of record in the file of this patent:

UNITED STATES PATENTS

| Number | Name | Date |
|---|---|---|
| 1,442,015 | Tillyer | Jan. 9, 1923 |
| 1,479,229 | Erfle | Jan. 1, 1924 |
| 1,616,723 | Wandersleb | Feb. 8, 1927 |
| 1,678,493 | Albada | July 24, 1928 |
| 2,178,857 | Hineline | Nov. 7, 1939 |
| 2,217,930 | Zimmermann | Oct. 15, 1940 |
| 2,386,614 | Kaprelian | Oct. 9, 1945 |
| 2,423,676 | Altman | July 8, 1947 |